(12) United States Patent
Chatterjee et al.

(10) Patent No.: US 11,832,267 B2
(45) Date of Patent: Nov. 28, 2023

(54) UPLINK TRANSMISSIONS IN PRECONFIGURED RESOURCES FOR ENHANCED MACHINE TYPE COMMUNICATION (EMTC) AND NARROW-BAND INTERNET OF THINGS (NB-IOT)

(71) Applicant: APPLE INC., Cupertino, CA (US)

(72) Inventors: Debdeep Chatterjee, San Jose, CA (US); Gregory V. Morozov, Nizhny Novgorod (RU); Qiaoyang Ye, San Jose, CA (US)

(73) Assignee: APPLE INC., Cupertino, CA (US)

( * ) Notice: Subject to any disclaimer, the term of this patent is extended or adjusted under 35 U.S.C. 154(b) by 358 days.

(21) Appl. No.: 17/265,764

(22) PCT Filed: Aug. 9, 2019

(86) PCT No.: PCT/US2019/046007
§ 371 (c)(1),
(2) Date: Feb. 3, 2021

(87) PCT Pub. No.: WO2020/033895
PCT Pub. Date: Feb. 13, 2020

(65) Prior Publication Data
US 2021/0345395 A1 Nov. 4, 2021

Related U.S. Application Data

(60) Provisional application No. 62/717,666, filed on Aug. 10, 2018.

(51) Int. Cl.
*H04W 72/23* (2023.01)
*H04W 4/80* (2018.01)
(Continued)

(52) U.S. Cl.
CPC ............. *H04W 72/23* (2023.01); *H04W 4/80* (2018.02); *H04W 56/0045* (2013.01); *H04W 76/27* (2018.02)

(58) Field of Classification Search
None
See application file for complete search history.

(56) References Cited

U.S. PATENT DOCUMENTS

2017/0367058 A1* 12/2017 Pelletier ............ H04W 72/0446
2018/0048413 A1*  2/2018 Liu ..................... H04W 76/27
(Continued)

FOREIGN PATENT DOCUMENTS

KR 1020170015969 A 2/2017

OTHER PUBLICATIONS

Huawei, Hisilicon,"Summary of remaining issues on UL data transmission procedure", R1-1800060, 3GPP TSG RAN WG1 NR Ad Hoc Meeting, Vancouver, Canada, Agenda Item 7.3.3.4, Jan. 22-26, 2018, 6 pages.
(Continued)

*Primary Examiner* — Clemence S Han
(74) *Attorney, Agent, or Firm* — Dorsey & Whitney LLP

(57) ABSTRACT

Technology for a low mobility user equipment (UE) operable to perform uplink (UL) transmissions using configured grant (CG) physical uplink shared channel (PUSCH) resources is disclosed. The UE can decode a CG PUSCH resource configuration from an eNodeB while the low mobility UE is in a radio resource control (RRC) connected state. The CG PUSCH resource configuration can indicate CG PUSCH resources for the low mobility UE after the low mobility UE transitions from the RRC connected state to an RRC idle state. The UE can transition from the RRC connected state to the RRC idle state. The UE can encode data packets for transmission over a PUSCH to the eNodeB
(Continued)

using the CG PUSCH resources while the low mobility UE is in the RRC idle state.

20 Claims, 10 Drawing Sheets

(51) Int. Cl.
*H04W 76/27* (2018.01)
*H04W 56/00* (2009.01)

(56) References Cited

U.S. PATENT DOCUMENTS

| 2018/0115430 | A1* | 4/2018 | Seo | H04W 76/27 |
| 2020/0053799 | A1* | 2/2020 | Jeon | H04W 16/14 |
| 2021/0243777 | A1* | 8/2021 | Tsai | H04W 74/006 |
| 2021/0315000 | A1* | 10/2021 | Li | H04W 72/0446 |

OTHER PUBLICATIONS

PCT/US2019/046007, International Search Report and Written Opinion, dated Nov. 29, 2019, 8 pages.

* cited by examiner

US 11,832,267 B2

UPLINK TRANSMISSIONS IN PRECONFIGURED RESOURCES FOR ENHANCED MACHINE TYPE COMMUNICATION (EMTC) AND NARROW-BAND INTERNET OF THINGS (NB-IOT)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
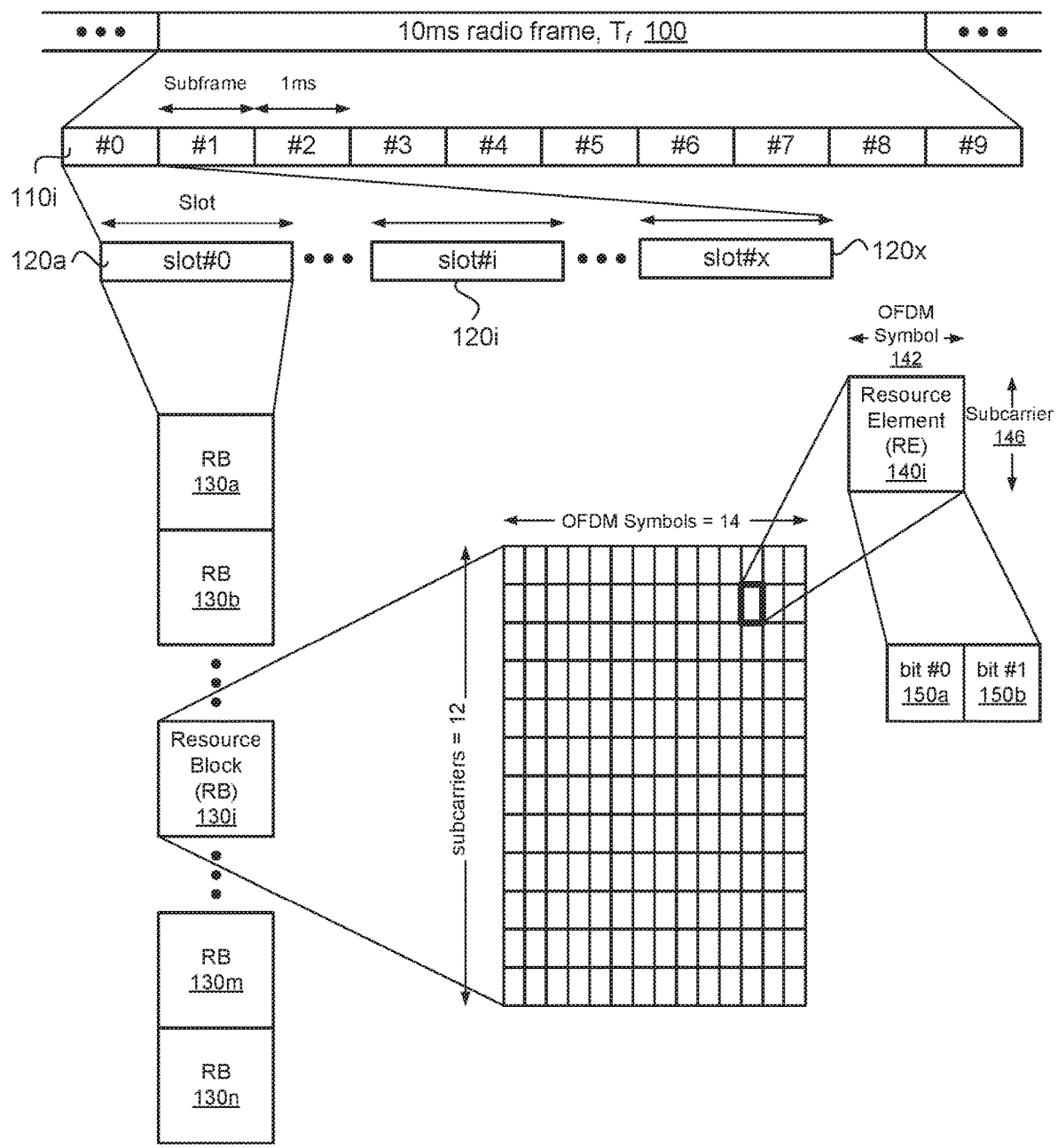
FIG. 1 illustrates a block diagram of a Third-Generation Partnership Project (3GPP) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$ of 1/µ ms, where µ=1 for 15 kHz subcarrier spacing, µ=2 for 30 kHz, µ=4 for 60 kHz, µ=8 for 120 kHz, and µ=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

In one configuration, uplink (UL) transmission and/or UE power consumption can be improved for Release 16 enhanced MTC (eMTC) and Release 16 narrowband Internet of Things (NB-IoT). For example, a design described herein can be used to support uplink transmission(s) using preconfigured resources in an idle and/or connected mode based on a single-carrier frequency-division multiple access (SC-FDMA) waveform for UEs with a valid timing advance. The preconfigured resources can include shared resources and/or dedicated resources. For example, the preconfigured resources can be a configured grant (CG) physical uplink shared channel (PUSCH). Further, the design described herein can be limited to orthogonal (multi) access schemes.

In one configuration, the design described herein can be used to support UL transmission(s) in preconfigured resources, for both idle and connected mode with a valid timing advance. Specifically, the design describes, for idle mode, applicable cases/conditions where UL transmission(s) in preconfigured resources with valid timing advance is supported, a relationship between idle mode and connected mode, including whether a common set of resources can be used in these two modes, and when or under what condition a UE can transit to connected mode, and retransmission and hybrid automatic repeat request (HARQ) process identification. In addition, the design describes, for connected mode, a resource configuration including configurations of time and frequency domain resources, modulation coding scheme and transport block size (MCS/TBS), redundancy version (RV), scrambling, UL power control, etc. Further, the design describes, for connected mode, a UE behavior in relation to grant-based transmissions including HARQ process identification and retransmission indication, and uplink control information (UCI) multiplexing.

In one configuration, the design described herein for supporting UL transmission(s) in preconfigured resources, for both idle and connected mode with a valid timing advance, can be applied to both eMTC and NB-IoT radio access systems.

In one configuration, there can be two types of UL configured grant in New Radio (NR) systems, which can include Type 1 which is based on radio resource control (RRC), and Type 2 which is based on RRC and layer 1 (L1) activation and deactivation (similar to LTE semi-persistent scheduling, or SPS). Either Type 1 or Type 2, or both Type 1 and Type 2, can be supported in Release-16 eMTC and NB-IoT.

In one example, for eMTC, both coverage enhancement (CE) mode A and CE mode B can be supported. In one example, a UE in CE mode B can only support Type 1 configured grant (CG) physical uplink shared channel (PUSCH) transmissions, thereby avoiding additional power consumption in monitoring and reception of activation downlink control information (DCI), which can necessitate a significant number of repetitions of an MTC physical downlink control channel (MPDCCH). Similarly, for NB-IoT, UEs using a highest one or two NB-IoT physical random access channel (NPRACH) repetition levels can only be configured with Type 1 CG PUSCH. Further, if supported, for UEs in an RRC idle mode, a configuration of the CG PUSCH can be based similar to Type 1 CG PUSCH, at least in not necessitating Layer 1 DCI-based activation and release.

In one configuration, in idle mode, one of the key challenges can involve the adjustment of a transmission timing for UL transmissions to counter a propagation delay, since the UE may not have a valid timing advance (TA) knowledge. However, in some situations with low mobility, a UE can possibly have valid TA information, even when the UE is in idle mode. Thus, a network can identify such low-mobility UEs that could be expected to maintain valid TAs even upon transitioning from an RRC idle state to an RRC connected state.

In one example, a base station can configure a UE while in an RRC connected state with resources for CG PUSCH transmissions after the UE transitions to an RRC idle state, without necessarily initiating a random access procedure in order to transmit data packets in the UL. Alternatively or addition, the base station can configure the UE with a timer such that upon a RRC connection release, the timer can be started and as long as the timer is active, the UE can transmit on configured resources for CG PUSCH transmissions using latest TA information at a time of RRC connection release.

In one example, in the case of an RRC connection release due to radio link failure (RLF), a UE may not assume a validity of existing UL TA information, nor shall the UE apply any timer to validate latest known UL TA information, even if configured.

In one example, for a resource configuration of an UL transmission in idle mode assuming valid UL TA, resources configured for connected mode (e.g., configured by dedicated RRC signaling) can be reused in idle mode. Alternatively or additionally, the base station can (re)configure CG PUSCH transmission configuration resources via system information block (SIB) signaling.

In one example, a UE can be configured with only one resource configuration for CG PUS CH transmissions. In another example, at least for transmissions in idle mode, only a single resource configuration can be supported. In connected mode, one or multiple resource configurations can be indicated to the UE, and one of these one or more multiple resource configurations can be identified for potential transmissions when in an idle state but with valid UL TA.

In one example, the base station can configure the UE to allow transmissions using a DL timing, e.g., TA=0, when transmitting from an RRC idle state. Such UL transmissions using a DL reference timing may or may not be subject to a TA validity timer having expired or not.

In one configuration, a UE can transition to an RRC connected mode upon transmission of an UL packet using CG PUSCH resources in an idle mode. Accordingly, the UE can be configured via higher layers to monitor for a M(/N) PDCCH (for eMTC and NB-IoT respectively) common search space (CS S) for random access procedure related DL control channel monitoring for either an UL grant indicating retransmission, or a downlink control information (DCI) format indicating early termination of UL transmissions or for scheduling of message 4 (Msg4) and RRC connection setup messages.

In one example, the UE can transmit a physical random access channel (PRACH) and initiate a random access procedure upon transmission using CG PUSCH resources in idle mode.

In one example, the UE can monitor the M(/N)PDCCH in a new common search space or a UE-specific search space (USS) or using a random access related CSS (Type 2 CSS for M(/N)PDCCH) to monitor for an UL grant indicating retransmission, or an early termination DCI indicating termination of UL transmissions. Further, if the UE does not detect an UL grant indicating retransmission, the UE can retransmit a packet after expiry of a timer T1, while, after expiration of another timer T2 (where T2 is greater than or equal to T1), the UE can transmit a new packet or go back to sleep.

In one example, with respect to full-duplex FDD UEs and a monitoring of an early termination DCI format, such monitoring can be configured to start before an end of a CG PUSCH transmission, e.g., the UE can monitor a MPDCCH search space for early termination DCI as configured as part of a CG PUSCH resource configuration for idle mode operation or as (re)configured via system information messages.

In one example, for indication of retransmission, a single HARQ process can be supported for transmission from idle mode. In another example, in case of multiple HARQ processes, a HARQ process identifier (PID) can be determined as a function of a time domain resource given by a hyper frame number (HFN), a system frame number (SFN), a subframe and/or a slot number (which is applicable at least for NB-IoT) indicating a first of a set of repetitions for which a single PUSCH transmission resource is defined.

In one configuration, with respect to a connected mode, similar considerations as previously described as for idle mode can apply for at least: resource configurations (could be multiple resource configurations in connected mode as described above); HARQ process identification (e.g., based on time domain resource indices for each transmission opportunity starting subframe or slot); M(/N)PDCCH monitoring for UL grant indicating retransmission realizing a switch to grant-based transmissions; and M(/N)PDCCH monitoring for DCI indicating early termination of PUSCH repetitions (for full duplex FDD UEs for eMTC).

In one example, with respect to a resource configuration, some or all of the following parameters/information can be configured via UE-specific RRC signaling: time domain resources, frequency domain resources, MCS/TBS, etc. The time domain resources can include a number of repetitions where the repetitions can occur on consecutive bandwidth reduced low complexity or coverage enhancement (BL/CE) UL subframes or NB-IoT UL subframes, resource Unit (RU) sizes, and a periodicity, which can be configured using a HFN, SFN, subframe, and/or slot index. The frequency domain resource can include NB for eMTC, an UL carrier for NB-IoT, sub-PRB/PRB level allocations which can include frequency domain resources within an identified NB (for eMTC) and within an UL carrier (for NB-IoT), and frequency hopping configuration for eMTC across configured NBs. Further, for CE mode A UEs, separate power control parameters (P0, alpha) can be configured for use when transmitting on these resources. Further, scrambling can follow an existing (N)PUSCH design, and an RV sequence can be fixed or configured, where candidates for RV cycling can include: {0, 2, 3, 1}, {0, 3, 0, 3}, or {0, 0, 0, 0}. Further, a demodulation reference signal (DMRS) configuration can follow that for grant-based PUSCH. Further, with respect to CE modes, for an eMTC configuration of CE modes A or B, separate resource configurations can be provided for UEs in CE mode A and B, and a corresponding behavior with respect to RV cycling, scrambling, frequency hopping, etc. can apply accordingly.

In one configuration, for eMTC, uplink control information (UCI) multiplexing can be supported for CE mode A for grant-based PUSCH in case the PUSCH and PUCCH are to be transmitted without any repetitions. In an example, the same principle can be extended such that when a CG PUSCH transmission opportunity overlaps in a time domain with a PUCCH transmission carrying UCI, the UCI can be piggybacked on the PUSCH. However, when either the CG PUSCH resources are configured with repetitions or the PUCCH is configured with repetitions, in case of overlap in the time domain, the PUCCH can be dropped. In another example, a PUCCH carrying HARQ acknowledgement (HARQ-ACK) feedback can be prioritized over a CG PUSCH transmission, while a PUCCH carrying channel state information (CSI) feedback can be dropped. In yet another example, the dropping or piggybacking behavior can be configured to the UE as part of a CG PUSCH resource configuration.

In one example, for an equivalent of Type 2 CG PUSCH with Layer 1 activation and release mechanisms, existing DCI formats 6-0A or 6-0B (if supported for CE mode B) can be used with certain fields being reserved to indicate specific values. Such fields can include: a HARQ ID, set to all 0's; a RV, set to all 0's, an MCS, set to all 1's (for release only), and a frequency domain resource assignment, set to all 1's (for release only).

In one example, for a transmission opportunity, a UE may not transmit a CG PUSCH unless the UE has data in a transmit (Tx) buffer from UE higher layers, and this feature can be referred to as "UL skipping". In another example, acknowledgement of activation and release DCIs can be via a media access control (MAC) channel element (CE) (as in LTE UL SPS or NR Type 2 CG PUSCH), or via physical layer resources, wherein a corresponding DCI (for UL scheduling) can be modified to indicate resources for PUCCH indicating the acknowledgment.

In one configuration, a design to support UL transmission(s) in preconfigured resources (referred to as a CG PUSCH) can be described herein. In one example, a resource configuration for the CG PUSCH can use RRC signaling. In another example, a resource configuration for the CG PUSCH can use RRC signaling and layer 1 activation and release via DCI.

In one example, a UE can be configured while in an RRC connected state with resources for CG PUSCH transmissions, which can occur after the UE transitions to an RRC idle state, and the CG PUSCH transmissions can occur without the UE necessarily initiating a random access procedure in order to transmit data packets in the UL In another example, the UE can be configured with a timer such that upon an RRC connection release, the timer can be started and as long as the timer is active, the UE can transmit on configured resources for CG PUSCH using latest TA information at a time of RRC connection release.

In one example, the UE can be configured to transmit using a DL timing, e.g., TA=0, when transmitting from an RRC idle state. In another example, the UE can transition to an RRC connected mode upon transmission of an UL packet using CG PUSCH resources in idle mode.

In one example, the UE can monitor a M(/N)PDCCH in a new common search space or using a random access related CSS (Type 2 CSS for M(/N)PDCCH) to monitor for an UL grant indicating retransmission or an early termination DCI indicating termination of UL transmissions. In another example, a single HARQ process can be supported for transmission from idle mode. In yet another example, in case of multiple HARQ processes, a HARQ PID can be determined as a function of a time domain resource given by a HFN, SFN, subframe, and/or slot number (which applicable at least for NB-IoT) indicating a first of a set of repetitions for a single PUSCH transmission opportunity.

Figure 2:
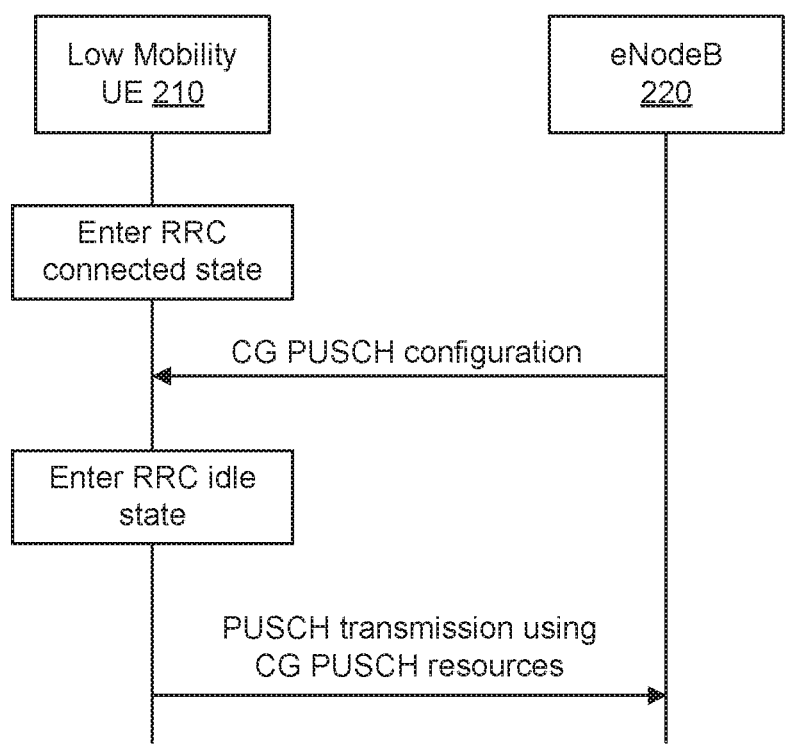
FIG. 2 illustrates signaling between a low mobility user equipment (UE) and an eNodeB to allow a physical uplink shared channel (PUSCH) transmission from the low mobility UE using configured grant (CG) PUSCH resources in accordance with an example.

FIG. 2 illustrates an example of signaling between a low mobility UE 210 and an eNodeB 220 to allow a PUSCH transmission from the low mobility UE using CG PUSCH resources. As used herein, a 'low mobility UE' can indicate a UE that moves or travels a reduced amount when in an RRC idle mode, such as less than 5 meters, less than 50 meters, less than 100 meters, less than 200 meters, etc. The low mobility UE 210 can enter an RRC connected state. The low mobility UE 210 can receiver a CG PUSCH configuration from the eNodeB 220. The CG PUSCH configuration can indicate the CG PUSCH resources for the low mobility UE 210 to use after the low mobility UE 210 transitions from the RRC connected state to the RRC idle state. After a period of time, the low mobility UE 210 can transition to the RRC idle state. The low mobility UE 210 can perform the PUSCH transmission using the CG PUSCH resources while the low mobility UE 210 is in the RRC idle state.

Figure 3:
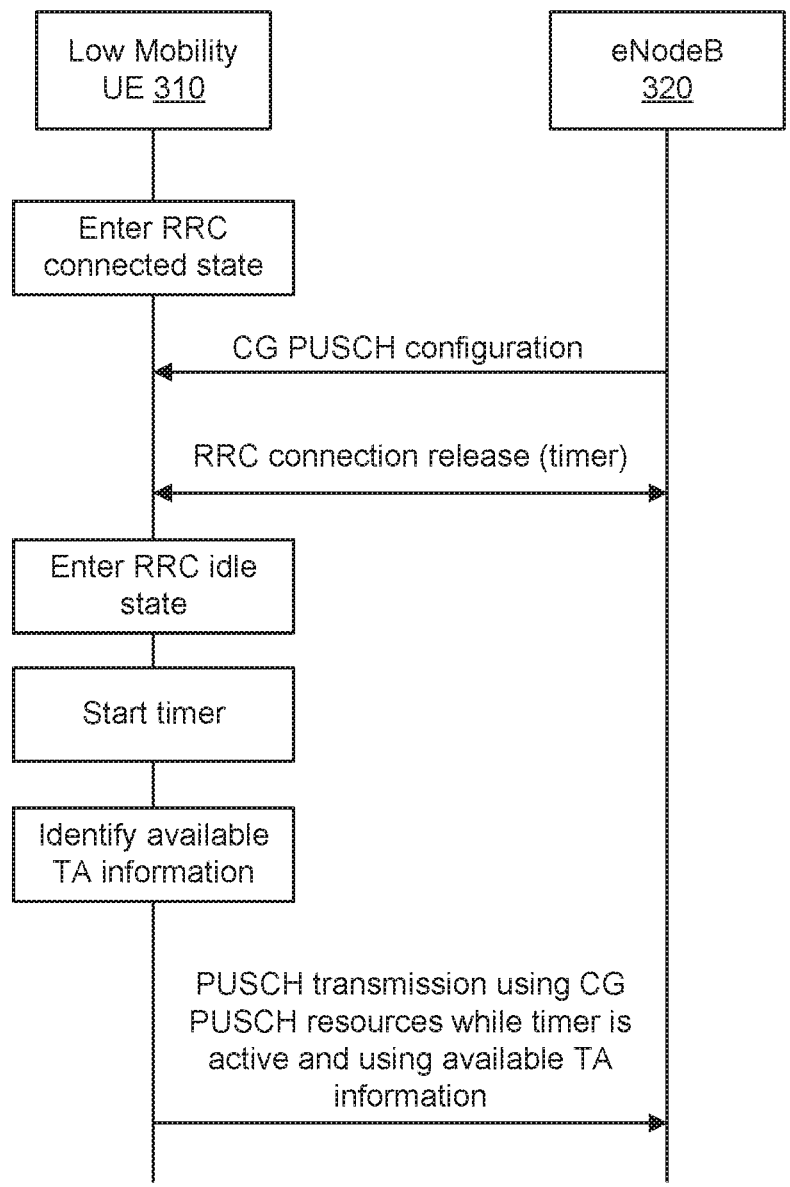
FIG. 3 illustrates signaling between a low mobility UE and an eNodeB to allow a PUSCH transmission from the low mobility UE using CG PUSCH resources in accordance with an example.

FIG. 3 illustrates an example of signaling between a low mobility UE 310 and an eNodeB 320 to allow a PUSCH transmission from the low mobility UE using CG PUSCH resources. The low mobility UE 310 can enter an RRC connected state. The low mobility UE 310 can receiver a CG PUSCH configuration from the eNodeB 320. The CG PUSCH configuration can indicate the CG PUSCH resources for the low mobility UE 310 to use after the low mobility UE 310 transitions from the RRC connected state to an RRC idle state. The eNodeB 320 and the low mobility UE 310 can perform an RRC connection release procedure, after which the low mobility UE 310 can transition to the RRC idle state. During the RRC connection release procedure, the low mobility UE 310 can receive a timer from the eNodeB 320. After the RRC connection release procedure, the low mobility UE 310 can enter into the RRC idle state and start the timer. Further, the low mobility UE 310 can identify available timing advance (TA) information at a time of the RRC connection release. The low mobility UE 310 can perform the PUSCH transmission using the CG PUSCH resources while the low mobility UE 310 is in the RRC idle state, and when the timer is active (i.e., not expired) and using the available TA information.

Figure 4:
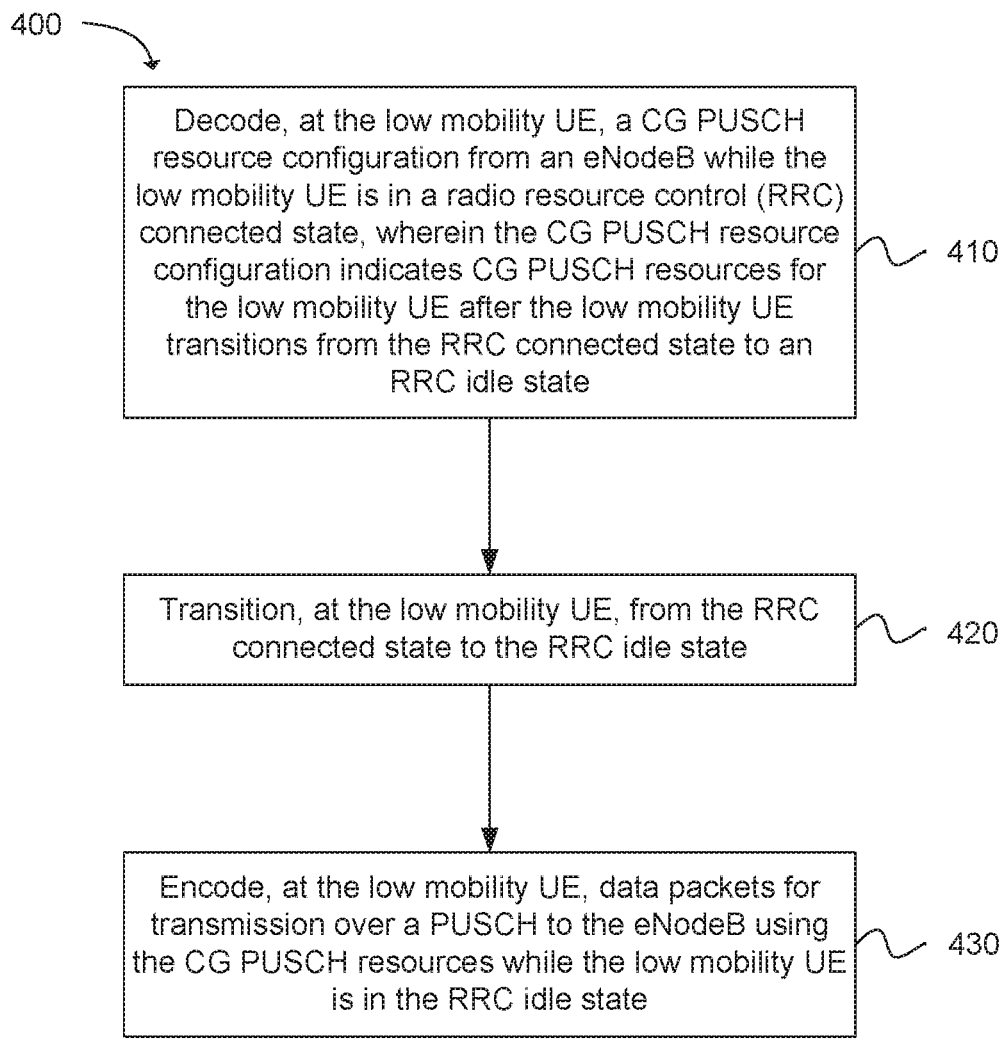
FIG. 4 depicts functionality of a low mobility user equipment (UE) operable to perform uplink (UL) transmissions using configured grant (CG) physical uplink shared channel (PUSCH) resources in accordance with an example.

Another example provides functionality 400 of a low mobility user equipment (UE) operable to perform uplink (UL) transmissions using configured grant (CG) physical uplink shared channel (PUSCH) resources, as shown in FIG. 4. The low mobility UE can comprise one or more processors configured to decode, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state, as in block 410. The low mobility UE can comprise one or more processors configured to transition, at the low mobility UE, from the RRC connected state to the RRC idle state, as in block 420. The low mobility UE can comprise one or more processors configured to encode, at the low mobility UE, data packets for transmission over a PUSCH to the eNodeB using the CG PUSCH resources while the low mobility UE is in the RRC idle state, as in block 430. In addition, the low mobility UE can comprise a memory interface configured to send to a memory the CG PUSCH resource configuration.

Figure 5:
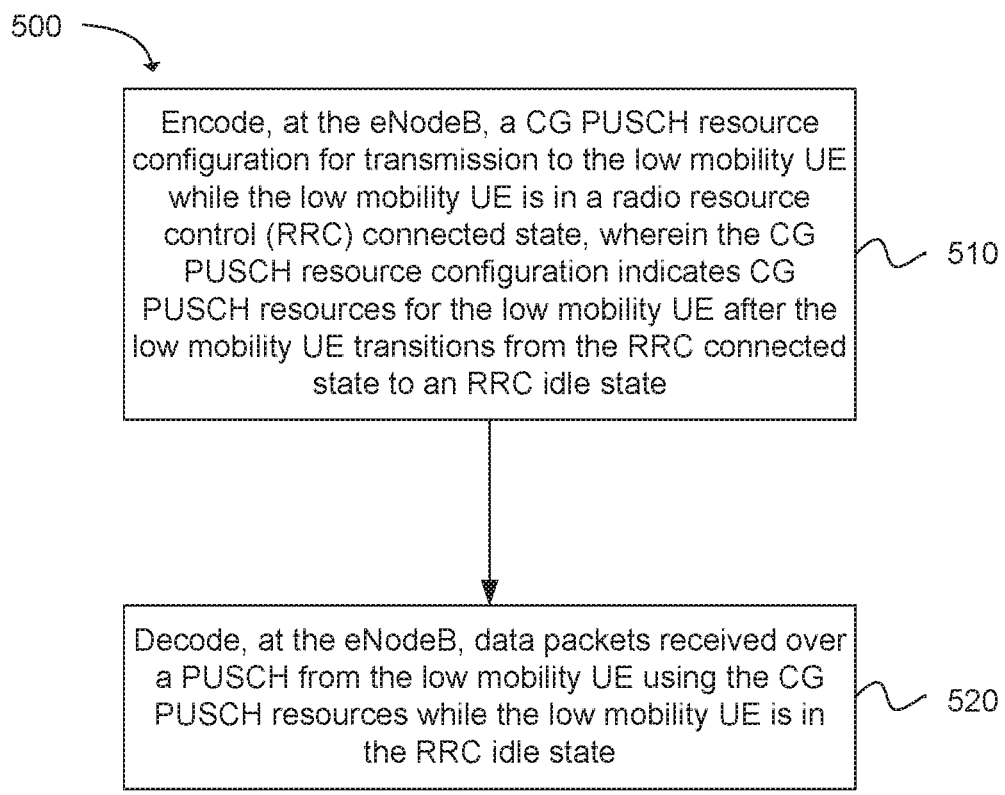
FIG. 5 depicts functionality of an eNodeB operable to decode uplink (UL) transmissions received from a low mobility user equipment (UE) using configured grant (CG) physical uplink shared channel (PUSCH) resources in accordance with an example.

Another example provides functionality 500 of an eNodeB operable to decode uplink (UL) transmissions received from a low mobility user equipment (UE) using configured grant (CG) physical uplink shared channel (PUSCH) resources, as shown in FIG. 5. The eNodeB can comprise one or more processors configured to encode, at the eNodeB, a CG PUSCH resource configuration for transmission to the low mobility UE while the low mobility UE is in a radio resource control (RRC) connected state, wherein the CG PUSCH resource configuration indicates CG PUSCH resources for the low mobility UE after the low mobility UE transitions from the RRC connected state to an RRC idle state, as in block 510. The eNodeB can comprise one or more processors configured to decode, at the eNodeB, data packets received over a PUSCH from the low mobility UE using the CG PUSCH resources while the low mobility UE is in the RRC idle state, as in block 520. In addition, the eNodeB can comprise a memory interface configured to retrieve from a memory the CG PUSCH resource configuration.

Figure 6:
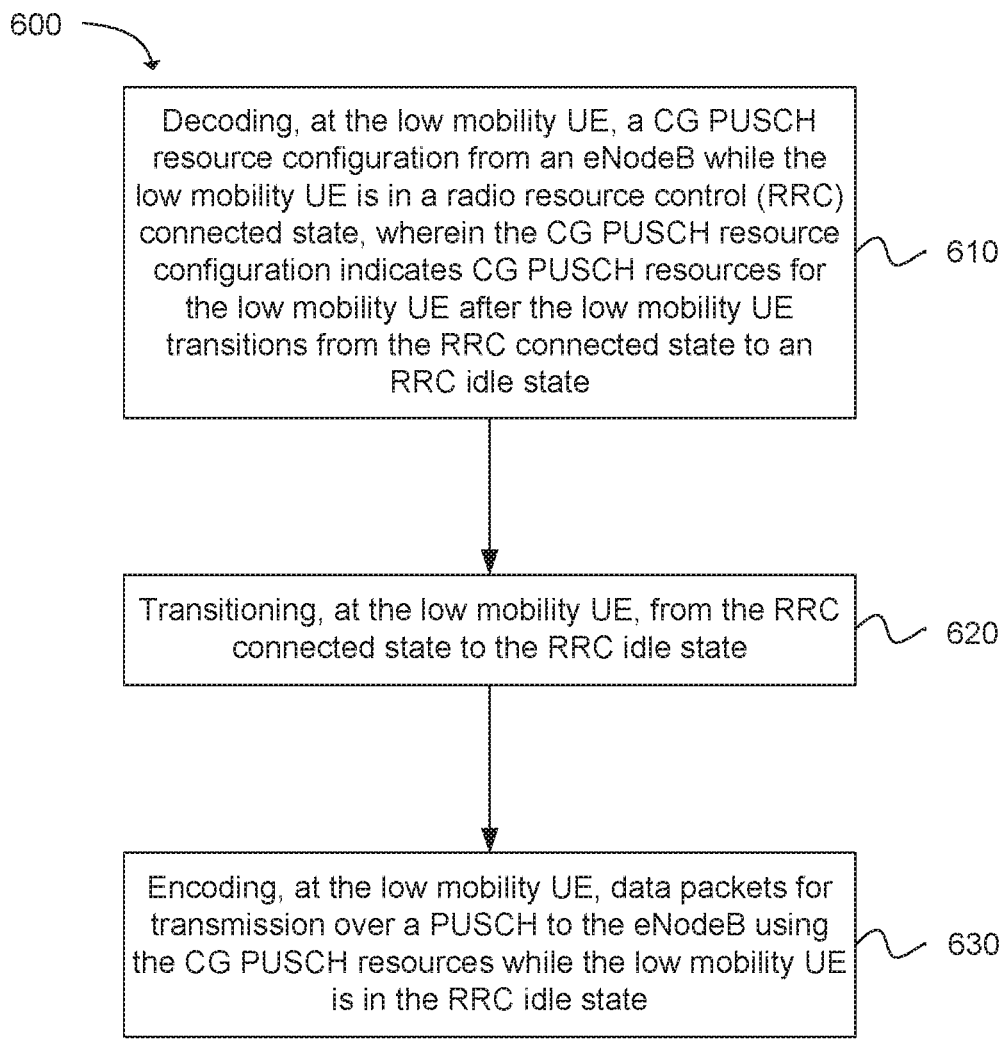
FIG. 6 depicts a flowchart of a machine readable storage medium having instructions embodied thereon for performing uplink (UL) transmissions using configured grant (CG) physical uplink shared channel (PUSCH) resources in accordance with an example.

Another example provides at least one machine readable storage medium having instructions 600 embodied thereon for performing uplink (UL) transmissions using configured grant (CG) physical uplink shared channel (PUSCH) resources, as shown in FIG. 6. The instructions can be executed on a machine, where the instructions are included on at least one computer readable medium or one non-transitory machine readable storage medium. The instructions when executed by one or more processors of a low mobility user equipment (UE) perform: decoding, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state, as in block 610. The instructions when executed by one or more processors of the low mobility UE perform: transitioning, at the low mobility UE, from the RRC connected state to the RRC idle state, as in block 620. The instructions when executed by one or more processors of the low mobility UE perform: encoding, at the low mobility UE, data packets for transmission over a PUSCH to the eNodeB using the CG PUSCH resources while the low mobility UE is in the RRC idle state, as in block 630.

Figure 7:
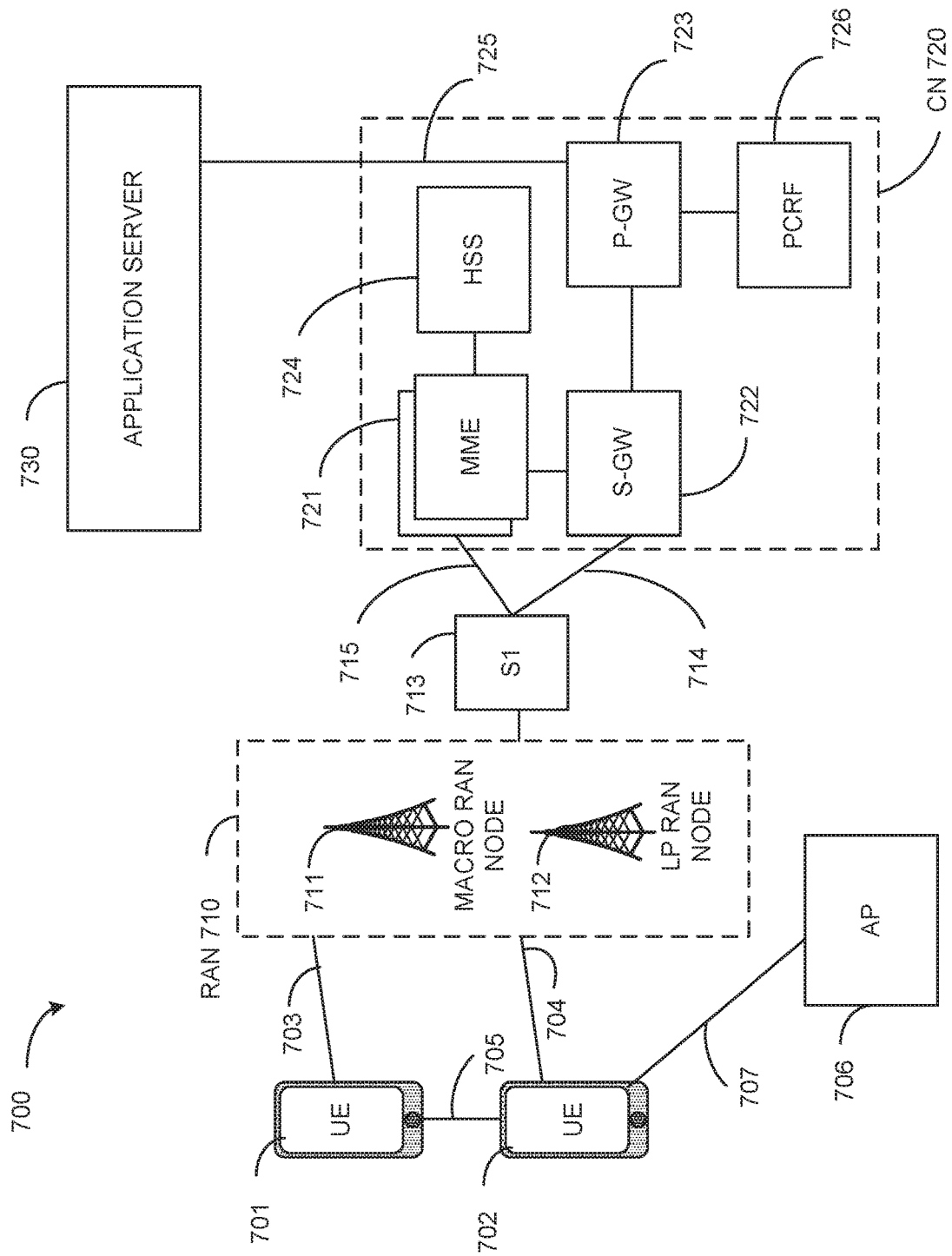
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
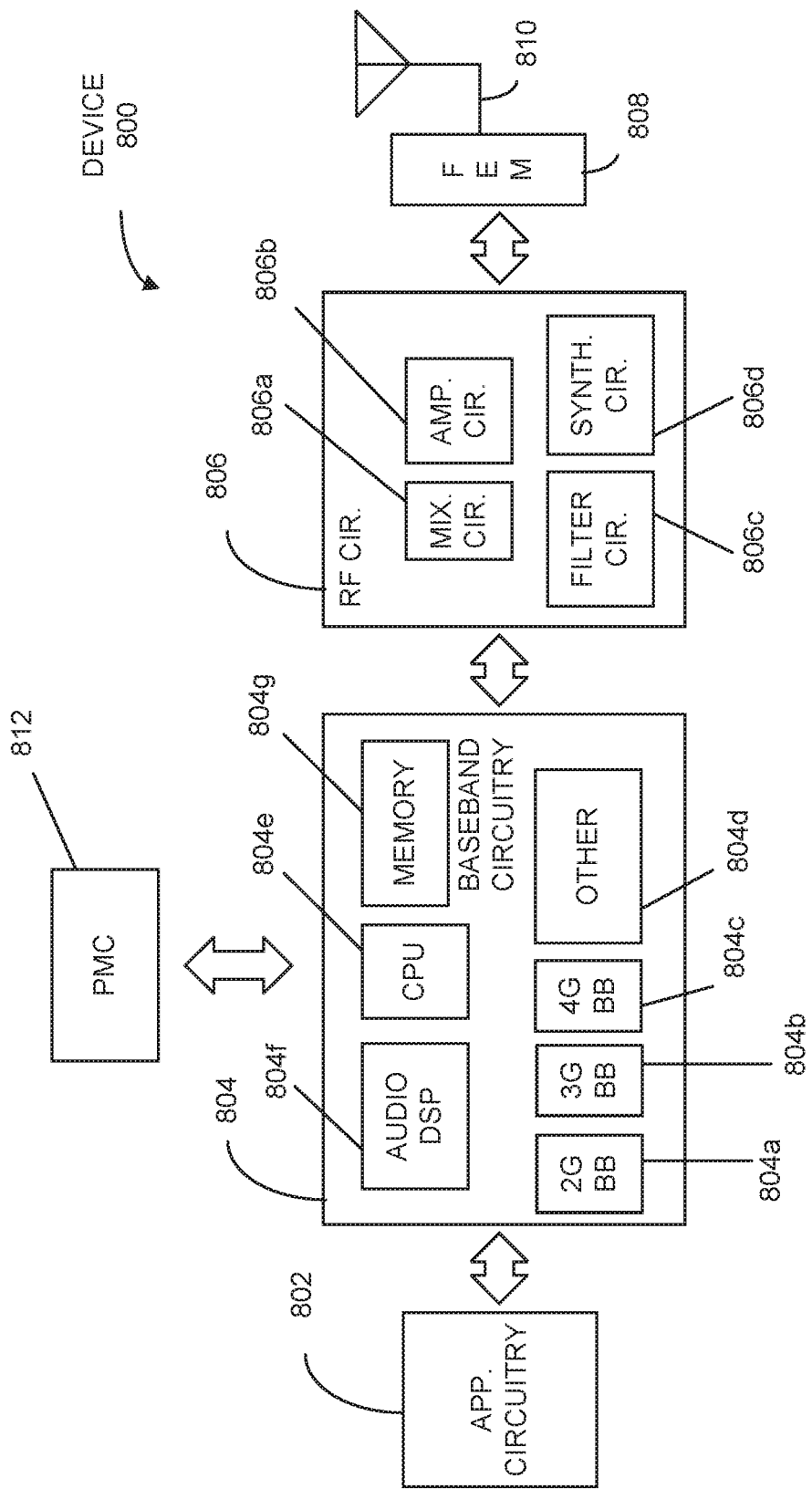
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804a, a fourth generation (4G) baseband processor 804b, a fifth generation (5G) baseband processor 804c, or other baseband processor(s) 804d for other existing generations, generations in development or to be developed in the future (e.g., second generation (2G), sixth generation (6G), etc.). The baseband circuitry 804 (e.g., one or more of baseband processors 804a-d) may handle various radio control functions that enable communication with one or more radio networks via the RF circuitry 806. In other embodiments, some or all of the functionality of baseband processors 804a-d may be included in modules stored in the memory 804g and executed via a Central Processing Unit (CPU) 804e. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor application circuitry 802 depending on the desired output frequency. In some embodiments, a divider control input (e.g., N) may be determined from a look-up table based on a channel indicated by the applications processor application circuitry 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
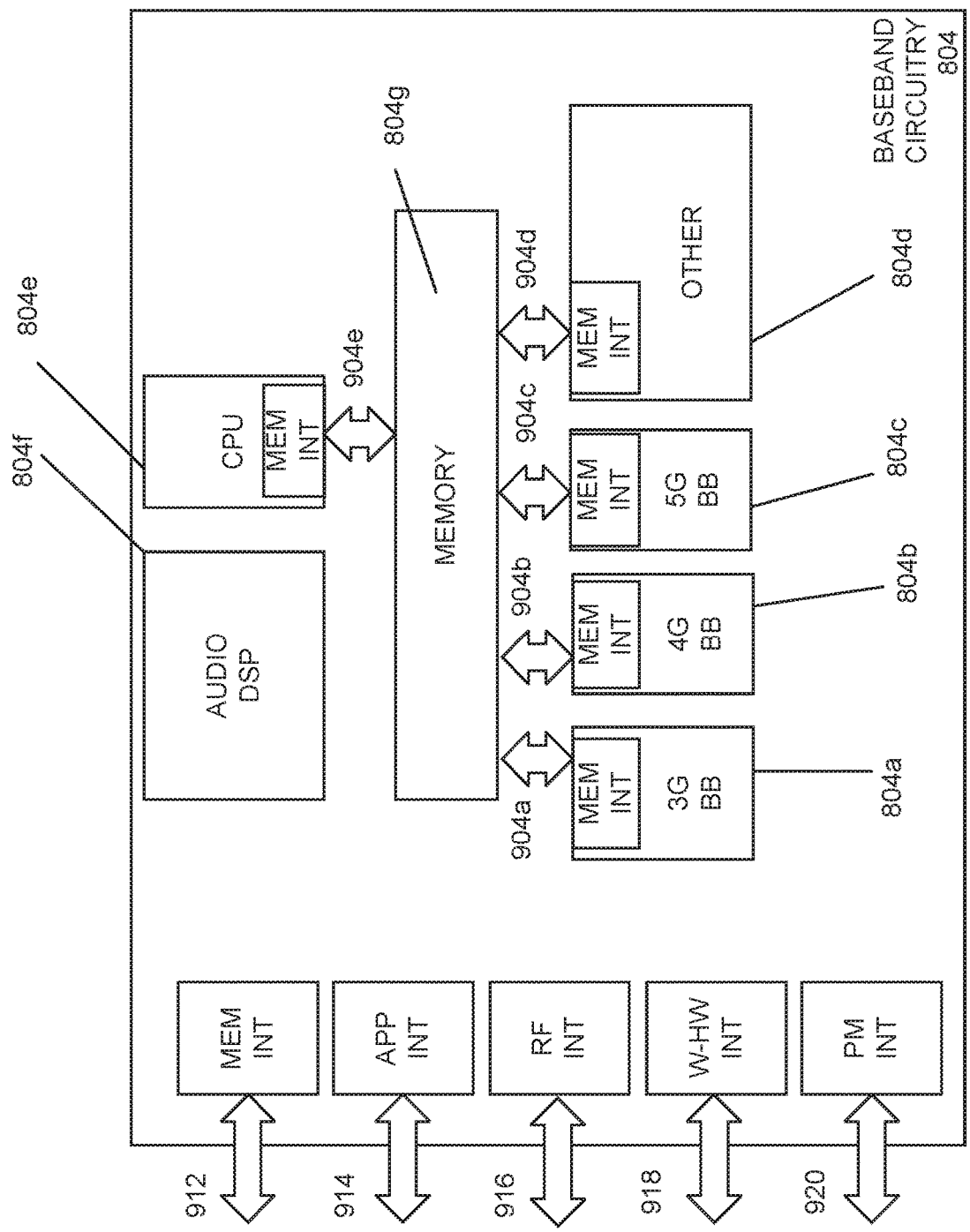
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804*a*-804*e* and a memory 804*g* utilized by said processors. Each of the processors 804*a*-804*e* may include a memory interface, 904*a*-904*e*, respectively, to send/receive data to/from the memory 804*g*.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
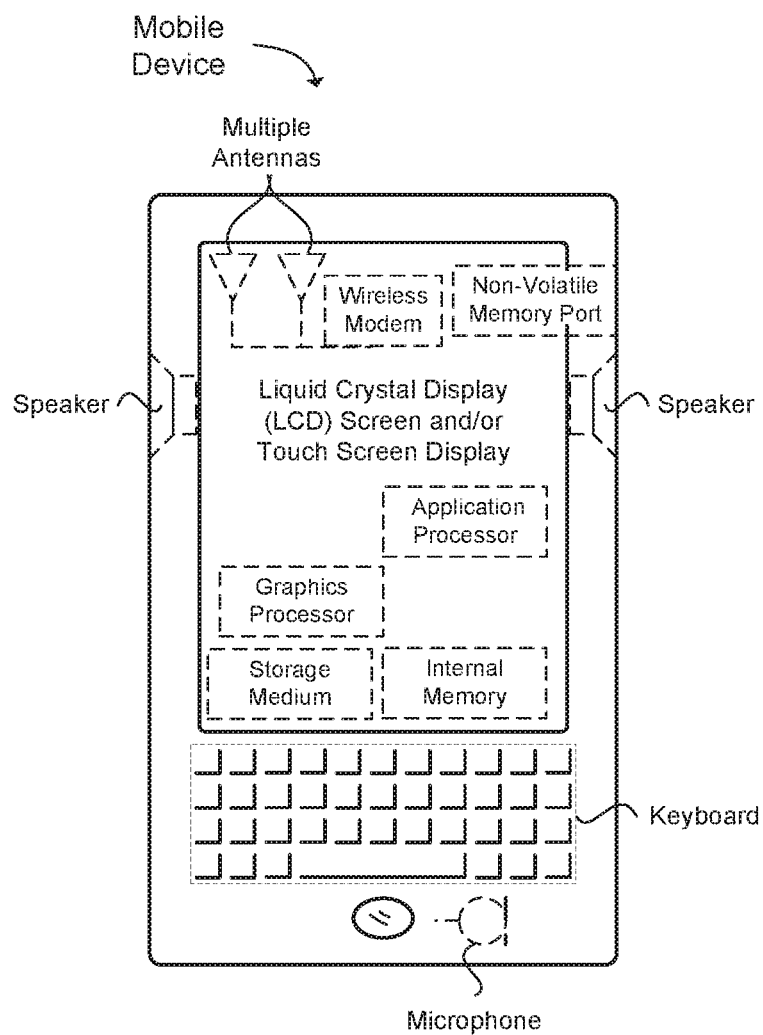
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a low mobility user equipment (UE) operable to perform uplink (UL) transmissions using configured grant (CG) physical uplink shared channel (PUSCH) resources, the apparatus comprising: one or more processors configured to: decode, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state; transition, at the low mobility UE, from the RRC connected state to the RRC idle state; and encode, at the low mobility UE, data packets for transmission over a PUSCH to the eNodeB using the CG PUSCH resources while the low mobility UE is in the RRC idle state; and a memory interface configured to send to a memory the CG PUSCH resource configuration.

Example 2 includes the apparatus of Example 1, further comprising a transceiver configured to: receive the CG PUSCH resource configuration from the eNodeB; and transmit the data packets over the PUSCH to the eNodeB.

Example 3 includes the apparatus of any of Examples 1 to 2, wherein the one or more processors are configured to: encode the data packets for transmission while the low mobility UE is in the RRC idle mode and without initiation of a random access procedure between the low mobility UE and the eNodeB.

Example 4 includes the apparatus of any of Examples 1 to 3, wherein the one or more processors are further configured to: decode a timer received from the eNodeB, wherein the timer is started upon an RRC connection release; and encode the data packets for transmission over the PUSCH to the eNodeB using the CG PUSCH resources while the low mobility UE is in the RRC idle state and while the timer is active, wherein the data packets are transmitted using available timing advance (TA) information at a time of the RRC connection release.

Example 5 includes the apparatus of any of Examples 1 to 4, wherein the one or more processors are configured to: decode the CG PUSCH resource configuration received from the eNodeB via system information block (SIB) signaling.

Example 6 includes the apparatus of any of Examples 1 to 5, wherein the one or more processors are further configured to: perform an UL transmission that includes the data packets using at least one of a downlink (DL) reference timing or timing advance (TA) information acquired during the RRC connected state when the low mobility UE is in the RRC idle state after an RRC connection release, wherein the DL reference timing is subject to a TA validity timer having expired.

Example 7 includes the apparatus of any of Examples 1 to 6, wherein the one or more processors are further configured to: perform an UL transmission that includes the data packets using a downlink (DL) reference timing, wherein the DL reference timing is subject to a timing advance (TA) validity timer having not expired.

Example 8 includes the apparatus of any of Examples 1 to 7, wherein the one or more processors are further configured to: perform a downlink (DL) control channel monitoring for an UL grant indicating a retransmission or a downlink control information (DCI) format indicating an early termination of UL transmissions, wherein the low mobility UE is configured to transition back to the RRC connected state after the transmission of the data packets over the PUSCH using the CG PUSCH resources while the low mobility UE is in the RRC idle mode.

Example 9 includes the apparatus of any of Examples 1 to 8, wherein the one or more processors are further configured to: monitor a machine type communication (MTC) physical downlink control channel (MPDCCH) or a narrowband Internet of Things (NB-IoT) PDCCH (NPDCCH) in a defined search space while the low mobility UE is in the RRC idle mode.

Example 10 includes the apparatus of any of Examples 1 to 9, wherein the one or more processors are configured to: encode the data packets for transmission during a transmission opportunity only when the data packets are located in a transmit (Tx) buffer of the low mobility UE.

Example 11 includes the apparatus of any of Examples 1 to 10, wherein the low mobility UE is configured to support Type 1 CG PUSCH transmissions, and the low mobility UE includes valid timing advance (TA) information when in the RRC idle state.

Example 12 includes the apparatus of any of Examples 1 to 11, wherein the CG PUS CH resources are applicable for an enhanced machine type communication (eMTC) radio access system or a narrowband Internet of Things (NB-IoT) radio access system.

Example 13 includes an apparatus of an eNodeB operable to decode uplink (UL) transmissions received from a low mobility user equipment (UE) using configured grant (CG) physical uplink shared channel (PUSCH) resources, the apparatus comprising: one or more processors configured to: encode, at the eNodeB, a CG PUSCH resource configuration for transmission to the low mobility UE while the low mobility UE is in a radio resource control (RRC) connected state, wherein the CG PUSCH resource configuration indicates CG PUSCH resources for the low mobility UE after the low mobility UE transitions from the RRC connected state to an RRC idle state; and decode, at the eNodeB, data packets received over a PUSCH from the low mobility UE using the CG PUS CH resources while the low mobility UE is in the RRC idle state; and a memory interface configured to retrieve from a memory the CG PUSCH resource configuration.

Example 14 includes the apparatus of Example 13, wherein the one or more processors are further configured to: encode a timer for transmission to the low mobility UE, wherein the timer is started upon an RRC connection release; and decode the data packets received over the PUSCH from the low mobility UE using the CG PUSCH resources while the low mobility UE is in the RRC idle state and while the timer is active, wherein the data packets are transmitted using available timing advance (TA) information at a time of the RRC connection release.

Example 15 includes the apparatus of any of Examples 13 to 14, wherein the one or more processors are configured to: encode the CG PUSCH resource configuration for transmission to the low mobility UE via system information block (SIB) signaling.

Example 16 includes the apparatus of any of Examples 13 to 15, wherein the CG PUS CH resources are applicable for an enhanced machine type communication (eMTC) radio access system or a narrowband Internet of Things (NB-IoT) radio access system.

Example 17 includes at least one machine readable storage medium having instructions embodied thereon for performing uplink (UL) transmissions using configured grant (CG) physical uplink shared channel (PUSCH) resources, the instructions when executed by one or more processors at a low mobility user equipment (UE) perform the following: decoding, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state; transitioning, at the low mobility UE, from the RRC connected state to the RRC idle state; and encoding, at the low mobility UE, data packets for transmission over a PUSCH to the eNodeB using the CG PUSCH resources while the low mobility UE is in the RRC idle state.

Example 18 includes the at least one machine readable storage medium of Example 17, further comprising instructions when executed perform the following: encoding the data packets for transmission while the low mobility UE is in the RRC idle mode and without initiation of a random access procedure between the low mobility UE and the eNodeB.

Example 19 includes the at least one machine readable storage medium of any of Examples 17 to 18, further comprising instructions when executed perform the following: performing an UL transmission that includes the data packets using a downlink (DL) reference timing, wherein the DL reference timing is subject to a timing advance (TA) validity timer having expired.

Example 20 includes the at least one machine readable storage medium of any of Examples 17 to 19, further comprising instructions when executed perform the following: performing an UL transmission that includes the data packets using a downlink (DL) reference timing, wherein the DL reference timing is subject to a timing advance (TA) validity timer having not expired.

Example 21 includes the at least one machine readable storage medium of any of Examples 17 to 20, further comprising instructions when executed perform the following: performing a downlink (DL) control channel monitoring for an UL grant indicating a retransmission or a downlink control information (DCI) format indicating an early termination of UL transmissions, wherein the low mobility UE is configured to transition back to the RRC connected state after the transmission of the data packets over the PUSCH using the CG PUSCH resources while the low mobility UE is in the RRC idle mode.

Example 22 includes the at least one machine readable storage medium of any of Examples 17 to 21, further comprising instructions when executed perform the following: monitoring a machine type communication (MTC) physical downlink control channel (MPDCCH) or a narrowband Internet of Things (NB-IoT) PDCCH (NPDCCH) in a defined common search space while the low mobility UE is in the RRC idle mode.

Example 23 includes the at least one machine readable storage medium of any of Examples 17 to 22, further comprising instructions when executed perform the following: encoding the data packets for transmission during a transmission opportunity only when the data packets are located in a transmit (Tx) buffer of the low mobility UE.

Example 24 includes the at least one machine readable storage medium of any of Examples 17 to 23, wherein the low mobility UE is configured to support Type 1 CG PUS CH transmissions.

Example 25 includes the at least one machine readable storage medium of any of Examples 17 to 24, wherein the CG PUSCH resources are applicable for an enhanced machine type communication (eMTC) radio access system or a narrowband Internet of Things (NB-IoT) radio access system.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a low mobility user equipment (UE) operable to perform uplink (UL) transmissions using configured grant (CG) physical uplink shared channel (PUSCH) resources, the apparatus comprising:
one or more processors configured to:
decode, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state;
transition, at the low mobility UE, from the RRC connected state to the RRC idle state; and
encode, at the low mobility UE, data packets for transmission over a PUSCH to the eNodeB using the CG PUSCH resources while the low mobility UE is in the RRC idle state; and a memory interface configured to send to a memory the CG PUSCH resource configuration.

2. The apparatus of claim 1, further comprising a transceiver configured to:
receive the CG PUSCH resource configuration from the eNodeB; and
transmit the data packets over the PUSCH to the eNodeB.

3. The apparatus of claim 1, wherein the one or more processors are configured to:
encode the data packets for transmission while the low mobility UE is in the RRC idle state and without initiation of a random access procedure between the low mobility UE and the eNodeB.

4. The apparatus of claim 1, wherein the one or more processors are further configured to:
decode a timer received from the eNodeB, wherein the timer is started upon an RRC connection release; and
encode the data packets for transmission over the PUSCH to the eNodeB using the CG PUSCH resources while the low mobility UE is in the RRC idle state and while the timer is active, wherein the data packets are transmitted using available timing advance (TA) information at a time of the RRC connection release.

5. The apparatus of claim 1, wherein the one or more processors are configured to:
decode the CG PUSCH resource configuration received from the eNodeB via system information block (SIB) signaling.

6. The apparatus of claim 1, wherein the one or more processors are further configured to:
perform an UL transmission that includes the data packets using at least one of a downlink (DL) reference timing or timing advance (TA) information acquired during the RRC connected state when the low mobility UE is in the RRC idle state after an RRC connection release, wherein the DL reference timing is subject to a TA validity timer having expired.

7. The apparatus of claim 1, wherein the one or more processors are further configured to:
perform an UL transmission that includes the data packets using a downlink (DL) reference timing, wherein the DL reference timing is subject to a timing advance (TA) validity timer having not expired.

8. The apparatus of claim 1, wherein the one or more processors are further configured to:
perform a downlink (DL) control channel monitoring for an UL grant indicating a retransmission or a downlink control information (DCI) format indicating an early termination of UL transmissions, wherein the low mobility UE is configured to transition back to the RRC connected state after a transmission of the data packets over the PUSCH using the CG PUSCH resources while the low mobility UE is in the RRC idle state.

9. The apparatus of claim 1, wherein the one or more processors are further configured to:
monitor a machine type communication (MTC) physical downlink control channel (MPDCCH) or a narrowband Internet of Things (NB-IoT) PDCCH (NPDCCH) in a defined search space while the low mobility UE is in the RRC idle state.

10. The apparatus of claim 1, wherein the one or more processors are configured to:
encode the data packets for transmission during a transmission opportunity only when the data packets are located in a transmit (Tx) buffer of the low mobility UE.

11. The apparatus of claim 1, wherein the low mobility UE is configured to support Type 1 CG PUSCH transmissions, and the low mobility UE includes valid timing advance (TA) information when in the RRC idle state.

12. The apparatus of claim 1, wherein the CG PUSCH resources are applicable for an enhanced machine type communication (eMTC) radio access system or a narrowband Internet of Things (NB-IoT) radio access system.

13. An apparatus of an eNodeB operable to decode uplink (UL) transmissions received from a low mobility user equipment (UE) using configured grant (CG) physical uplink shared channel (PUSCH) resources, the apparatus comprising:
one or more processors configured to:
encode, at the eNodeB, a CG PUSCH resource configuration for transmission to the low mobility UE while the low mobility UE is in a radio resource control (RRC) connected state, wherein the CG PUSCH resource configuration indicates CG PUSCH resources for the low mobility UE after the low mobility UE transitions from the RRC connected state to an RRC idle state; and
decode, at the eNodeB, data packets received over a PUSCH from the low mobility UE using the CG PUSCH resources while the low mobility UE is in the RRC idle state; and
memory interface configured to retrieve from a memory the CG PUSCH resource configuration.

14. The apparatus of claim 13, wherein the one or more processors are further configured to:
encode a timer for transmission to the low mobility UE, wherein the timer is started upon an RRC connection release; and
decode the data packets received over the PUSCH from the low mobility UE using the CG PUSCH resources while the low mobility UE is in the RRC idle state and while the timer is active, wherein the data packets are transmitted using available timing advance (TA) information at a time of the RRC connection release.

15. The apparatus of claim 13, wherein the one or more processors are configured to: encode the CG PUSCH resource configuration for transmission to the low mobility UE via system information block (SIB) signaling.

16. The apparatus of claim 13, wherein the CG PUSCH resources are applicable for an enhanced machine type communication (eMTC) radio access system or a narrowband Internet of Things (NB-IoT) radio access system.

17. At least one non-transitory machine readable storage medium having instructions embodied thereon for performing uplink (UL) transmissions using configured grant (CG) physical uplink shared channel (PUSCH) resources, the instructions when executed by one or more processors at a low mobility user equipment (UE) perform the following:
decoding, at the low mobility UE, a CG PUSCH resource configuration from an eNodeB while the low mobility UE is in a radio resource control (RRC) connected state, wherein the CG PUSCH resource configuration indicates CG PUSCH resources for the low mobility UE after the low mobility UE transitions from the RRC connected state to an RRC idle state;
transitioning, at the low mobility UE, from the RRC connected state to the RRC idle state; and
encoding, at the low mobility UE, data packets for transmission over a PUSCH to the eNodeB using the CG PUSCH resources while the low mobility UE is in the RRC idle state.

18. The at least one non-transitory machine readable storage medium of claim 17, further comprising instructions when executed perform the following:
- encoding the data packets for transmission while the low mobility UE is in the RRC idle state and without initiation of a random access procedure between the low mobility UE and the eNodeB.

19. The at least one non-transitory machine readable storage medium of any of claim 17, further comprising instructions when executed perform the following:
- performing an UL transmission that includes the data packets using a downlink (DL) reference timing, wherein the DL reference timing is subject to a timing advance (TA) validity timer having expired.

20. The at least one non-transitory machine readable storage medium of claim 17, further comprising instructions when executed perform the following:
- performing an UL transmission that includes the data packets using a downlink (DL) reference timing, wherein the DL reference timing is subject to a timing advance (TA) validity timer having not expired.

* * * * *